(12) United States Patent
Rogers

(10) Patent No.: US 10,313,025 B2
(45) Date of Patent: Jun. 4, 2019

(54) INFORMATION PROCESSING SYSTEM USING OPTICALLY ENCODED SIGNALS

(71) Applicant: Gordon W. Rogers, Santa Barbara, CA (US)

(72) Inventor: Gordon W. Rogers, Santa Barbara, CA (US)

(*) Notice: Subject to any disclaimer, the term of this patent is extended or adjusted under 35 U.S.C. 154(b) by 223 days.

(21) Appl. No.: 15/110,814

(22) PCT Filed: Jan. 10, 2015

(86) PCT No.: PCT/US2015/010930
§ 371 (c)(1),
(2) Date: Jul. 11, 2016

(87) PCT Pub. No.: WO2015/126535
PCT Pub. Date: Aug. 27, 2015

(65) Prior Publication Data
US 2016/0329971 A1    Nov. 10, 2016

Related U.S. Application Data

(60) Provisional application No. 61/926,160, filed on Jan. 10, 2014.

(51) Int. Cl.
*G06F 13/42* (2006.01)
*H04B 10/80* (2013.01)
(Continued)

(52) U.S. Cl.
CPC ......... *H04B 10/803* (2013.01); *G02B 5/10* (2013.01); *G02B 17/0605* (2013.01);
(Continued)

(58) Field of Classification Search
CPC ..... G06F 13/426; G02B 5/10; G02B 17/0605; H04B 10/803; H04Q 11/0005; H04Q 2011/0026; H04Q 2011/0049
See application file for complete search history.

(56) References Cited

U.S. PATENT DOCUMENTS

| | | | | |
|---|---|---|---|---|
| 4,596,050 A | * | 6/1986 | Rogers ................. | H04B 10/801 250/551 |
| 2010/0171961 A1 | * | 7/2010 | Jeannot ................. | G01B 11/06 356/503 |
| 2012/0274937 A1 | * | 11/2012 | Hays ..................... | G01S 17/58 356/337 |

* cited by examiner

*Primary Examiner* — Henry Tsai
*Assistant Examiner* — John B Roche
(74) *Attorney, Agent, or Firm* — Greenspoon Marder LLP; Todd J. Langford

(57) ABSTRACT

An information-processing system having spherical and parabolic reflectors, optical signal processors, and detectors comprising optically active surfaces. The spherical reflector has an internal light-reflecting surface and a spherical processor with internal and external optically active surfaces, with its center coincident with that of the spherical reflector. The optical signal processor's internal and external surfaces include transmitters and detectors for transmitting and receiving a optically encoded signals along various distinct paths. A portion of the internal path coincides with a line that passes through the center of the sphere. Optical signals emitted from the external surface of the processing sphere and reflected by the internal surface of the external spherical reflector to neighboring regions of the processing sphere, enabling external relay of information around the sphere without congesting the internal cavity of the sphere. This makes possible multiple uses of the same optical frequency during a given time period.

18 Claims, 7 Drawing Sheets

(51) Int. Cl.
*G02B 5/10* (2006.01)
*G02B 17/06* (2006.01)
*H04Q 11/00* (2006.01)

(52) U.S. Cl.
CPC ....... *G06F 13/426* (2013.01); *H04Q 11/0005* (2013.01); *H04Q 2011/0026* (2013.01); *H04Q 2011/0049* (2013.01)

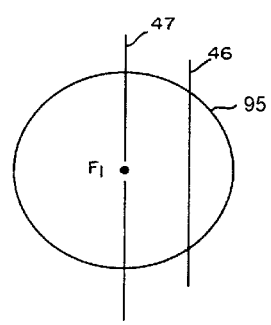
FIG.—4A
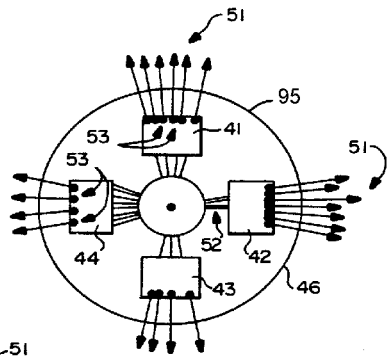
FIG.—4B
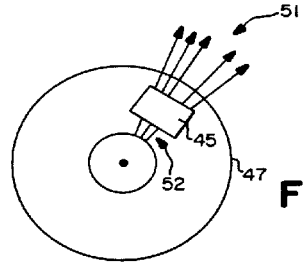
FIG.—4C

INFORMATION PROCESSING SYSTEM USING OPTICALLY ENCODED SIGNALS

CROSS REFERENCE TO RELATED APPLICATIONS

This application claims the benefit of U.S. Prov. Pat. App. No. 61/926,160 filed on Jan. 10, 2014, the entirety of which is hereby incorporated by reference.

BACKGROUND OF THE INVENTION

Field of the Invention: This invention relates generally to information processing systems, and more particularly to a system architecture and organizational method which facilitates the routing of optically encoded signals to and from selected portions of such a system. This invention also relates generally to information-processing systems having inherent topological similarities to neurological architectures.

Another aspect of the prior art concerns the well-known mathematical properties of spheres, parabolas, and hyperboloids. For instance, it is well known that a spherical reflector (i.e., a spherical body having an internal light-reflecting surface) will reflect light emanating from its center back to that center regardless of the direction that the light is transmitted. See for example, U.S. Pat. No. 3,238,470 (Mooney), U.S. Pat. No. 3,266,313 (Litterst); U.S. Pat. No. 3,588,739 (Yoshikawa et al.); U.S. Pat. No. 3,801,773 (Matsumi); and U.S. Pat. No. 4,360,275 (Louderback). Similarly, the mathematical properties of parabolic reflectors are well known.

Information processing systems that incorporate or use optical signal processing often include a variety of optical signal-processing components, use of fiber optics for routing signals from one point to another, methods for converting optical signals into electronic signals and vice versa, and optical means (e.g., mirrors) for changing the direction of light beams. The problem addressed by the current disclosure is system architecture. Bus structures and other standard system architectures are essential to the development of useful electronic computer systems. Due to the nature of optical signals and fiber optic carriers, the use of such bus structures to convey optically encoded signals is cumbersome. Thus there is a need for a different method or architecture for routing optically encoded signals from one part of an information processor to another. The present invention provides such an architecture.

This disclosure provides solutions to several prior limitations. The prior art has physical limitations for routing signals carried on the same frequency of light concurrently in different parts of the system during the same time period without node-to-node crosstalk and a dramatically increased number of wires or fibers needed to interconnect elements of a parallel processing system. This has resulted in significant technical limitations for applications of such systems.

Thus there has existed a long-felt need for an improved information-processing system architecture using an optical signal routing system.

SUMMARY OF THE INVENTION

The current disclosure provides just such a solution by having an information-processing system having spherical and parabolic reflectors, optical signal processors, and detectors comprising optically active surfaces. The spherical reflector has an internal light-reflecting surface and a spherical processor with internal and external optically active surfaces, with its center coincident with that of the spherical reflector. The optical signal processor's internal and external surfaces include transmitters and detectors for transmitting and receiving a plurality of optically encoded signals along various distinct paths, where a portion of the internal path coincides with a line that passes through the center of the spheres; where signals travel along a path emanating from the sphere's center as they are relayed to and from the parabolic reflector to and from the internal processing surface; and where optical signals emitted from the external surface of the processing sphere and reflected by the internal surface of the external spherical reflector to neighboring regions of the processing sphere, enabling external relay of information around the sphere without congesting the internal cavity of the sphere. This makes possible multiple uses of the same optical frequency during a given time period.

It is therefore an objective of the current disclosure to provide an improved information-processing system architecture using an optical signal routing system.

Another objective of the current disclosure is to provide an improved optical signal routing system making advantageous use of the light reflecting properties of spheres and paraboloids.

Yet another objective of the current disclosure is to reduce the number of mechanical connectors needed in an optical signal routing system.

A further objective of the current disclosure is to provide inherent topological similarities to neurological architectures of the thalamus, corona radiata, corpus callosum or commissura anterior cerebri and cortex of the human brain, to support applications such as the US Government's BRAIN Initiative, including computational neuroscience (the study of brain function in terms of the information-processing properties of the structures that make up the nervous system and its columnar and topographic architecture, and learning and memory both as a model of, and a simulator for, these structures); the European Union's Human Brain Project (directed by the École polytechnique fédérale de Lausanne), which aims to simulate the complete human brain on supercomputers to better understand how it functions and to simulate drug treatments. These approaches also include Google's Large Scale Deep Learning Experiments, which use 16,000 CPU cores as part of Google's Brain Project.

Yet another objective of the current disclosure is to provide management of large-volume video sensor data in optical video networks with the purpose of increasing the bandwidth and improving data-transfer efficiency. This has numerous application opportunities, as the field of remote sensing is now challenged by the immense amount of data needing to be transmitted to the observer. Bandwidth limitations currently restrict the growth potential in this area.

Yet another objective of the current disclosure is to overcome physical limits provided by conventional means Moore's Law in video processing in moving toward multi-core systems. Current HD formats (1920×1080p) have six times as much data to process compared to other formats, posing power and bandwidth limitations and challenges.

A further objective of the current disclosure is to provide minor-based optical routing for the next domain in head-end systems, including systems-level optical integration of discrete sensor arrays and processors using speed of light parallel process in zero-skew systems, providing maximal signal strength with a neurologic architectural basis for integrated image and digital data stream applications suitable for packet-switched networks.

Yet another objective of the current disclosure is to provide a solution to an industry-wide problem of networking imaging systems and dominance in the capture, analysis, and control systems through upwardly scalable concurrent multiscene and large-format assessments with improved performance using integrated images and digital data systems with inherent orientation-independent pattern-recognition properties through corrective optics, enabling image transfer using parallel operating systems coordinating target-signal identification, assessment, and response.

An additional objective of the current disclosure is to use commercial off-the-shelf optical communications hardware and proven image-processing algorithms, images obtained from multiple locations processed individually and interpreted as a composite. Multicore processors and multi-thread software dedicated to special functions will process the content continuously, independent of the artifacts of the various sensors' data.

Minor amounts of image processing (such as edge enhancement for locating objects of interest) would ignite localized signals. These signals might trigger a local reaction (such as a lock-down or face recognition), but they are also relayed to a central processing area where more intense processing on the composite image can be performed. This composite image can be interpreted as a whole, coordinating and prioritizing goals and actions. These goals could be detection or discrimination, while the actions might include identification, tracking, or interacting with personnel or objects of interest.

Yet another objective of the current disclosure is to provide a system architecture for multiple inputs, analysis, and command using simple minors to route images and data from multiple field locations with non-homogeneous sensors for trajectory and pattern recognition using single, double, or higher-order reflection routings by integrated and discrete optoelectronic routing using conventional processing and memory elements.

A further objective of the current disclosure is to enable general persistent surveillance. Applications include satellite-based strategic theater monitoring, planning, and deployment of resources for use in Homeland Security (including border monitoring), Drug Enforcement Agency support for harbor security and port activities; unmanned monitoring of multiple sensors in airports, subways, public areas (including ballparks, museums, concerts, and parking lots); urban security; urban transport collision avoidance: and complex process monitoring.

Additional novel and attractive aspects of the system include systems hardened against radiation and electromagnetic interference that are resistant to shock, use lower power, and weigh less, yet with increased processing power and speed.

A further objective of the invention is to provide systematic routing for signals carried on the same frequency of light concurrently in different parts of the system during the same time period without node-to-node crosstalk, while dramatically reducing the number of wires or fibers needed to interconnect elements of a parallel processing system.

There is provided an information-processing system having spherical and parabolic reflectors, an optical signal processor, and transmitters and receivers. The spherical reflector has an internal light-reflecting surface and center point. The optical signal processor includes transmitters and receivers for transmitting a plurality of optically encoded signals along various distinct paths, where a portion of each path coincides with a line that passes through the sphere's center point. Where these signals travel along a path emanating from the first center point, they are reflected by the parabolic reflector toward the internal surface of the processor. The receiver, which is at least partially located about the center point of the sphere, collects those reflected signals for further processing. In a preferred embodiment, the receiver includes a parabolic reflector with an external light-reflecting surface, and its focal point coincides with the center point of the spherical reflector. The system allows connectorless routing of optical signals of a given frequency concurrently between parts of an information-processing system.

A particular embodiment of the current disclosure provides for an information processing system comprising a means defining an external reflecting surface in the shape of a parabola; and optical signal-processing means, including means for simultaneously transmitting a plurality of distinct optically encoded signals along various distinct paths, a portion of each said path coinciding with a line emanating from the focus of said parabolic reflector. The information-processing system further includes a means defining an internal reflecting surface in the shape of a sphere; and optical signal-processing means including means for simultaneously transmitting a plurality of distinct optically encoded signals along various distinct paths, a portion of each said path coinciding with a line emanating from the center of the sphere, whereby said signals are reflected from said reflecting surface toward the internal surface of the spherical optical signal-receiving means for collecting said signals, after reflection from said external parabolic reflecting surface, for further processing; wherein at least a part of said optical signal-processing means is located at or around said focal point of said parabolic reflector; and said optical signal-receiving means include optical routing means for reflecting optically encoded signals converging on said focal point back to said optical signal-processing means.

A further embodiment provides for an information-processing system as set forth above, wherein said optical signal-processing means include emission of optically encoded signals from the external surface of said spherical processor toward the internal surface of said internal surface of said internally reflective spherical reflector to detector means on the external surface of the spherical processor for processing or retransmission of optically encoded information to other elements of the spherical processor. The optical-receiving means include (a) parabolic reflector means having a focal point coinciding with spherical processor; and (b) a multiplicity of optical-receiving elements located so that a multiplicity of said paths of said optically encoded signals are substantially equal in length. The receiving means include parabolic reflector means having a focal point coinciding with one of said focal point of said spherical processor, and said internal spherical reflector; whereby said parabolic reflector means reflects optically encoded signals along a path substantially coincident with radii of said spherical processor. The optical signal-receiving means include a second processing means located at a point remote from said spherical processor; and a first reflector means located at or around said spherical center point for reflecting, and thereby routing, optically encoded signals traveling between said optical signal-processing means and said second processing means; whereby information carried in optically encoded signals can be optically routed between said signal-processing means and other portions of said information-processing system by means of reflection. The optical-receiving means may include multifaceted reflector means located at or around said spherical center point, including said first reflector means, and further including parabolic reflector means having a focal point coinciding with said spherical center point; and a multiplicity of receiver elements located in or around said optical signal-processing means and positioned so as to receive signals reflected by said parabolic reflector means. The first reflector means include hyperboloid reflector means having a focal point coinciding with one of the focal points of said spherical reflector center point. Each facet of said multifaceted reflector means has a focal point coinciding with said spherical reflector. An additional reflector is substantially obscured from optically encoded signals emanating toward the primary parabolic reflector to provide routings of further optically encoded signals to the internal surface of the processing means.

Yet another embodiment of the current disclosure is an information-processing system comprising means defining an internal reflecting surface in the shape of a sphere; optical signal-processing means, including means for transmitting a plurality of optically encoded signals along various distinct paths, a portion of each said path coinciding with a line emanating from a spherical center point, whereby said signals are reflected from said reflecting surface toward the second internal surface of said spherical processor; and optical signal-receiving means for collecting said signals, after reflection from said parabolic reflecting surface, for further processing; wherein at least a part of said optical signal-processing means is located at or around said first focal point of said spherical reflector; said optical receiving means include parabolic reflector means having a focal point coinciding with said spherical center point; said parabolic reflector means is oriented so as to reflect optically encoded signals, each traveling along a path including a line emanating from the spherical center point that is not coincident with the focal point of said parabolic reflector, along said rays of said spherical reflector that is not coincident with the focal point of said parabolic reflector; and said optical routing means also include mirror means, external to said spherical reflector means, for routing signals traveling along paths emanating from said parabolic reflector back to said optical signal-processing means.

An additional embodiment of the current disclosure is a method of processing information, the steps comprising providing an internal reflecting surface in the shape of a sphere having a spherical center point; providing an optical signal-processing means for the processing of optical information at least a part of which is located at or around said spherical center point; simultaneously transmitting distinct optically encoded signals from said optical signal-processing means along a plurality of distinct paths, a portion of each said path coinciding with a line emanating from said spherical center point, whereby said signals are reflected from said reflecting surface toward said spherical center point; and collecting said signals after reflection from said reflecting surface for further processing; wherein said collecting step includes the step of further reflecting a multiplicity of said optically encoded signals, after reflection from said internal spherical reflecting surface, to said optical signal-processing means. The method may further include the steps of providing optical signal-receiving means and information-processing means located at a point remote from said spherical center point; and further reflecting a plurality of said signals, after reflection from said spherical reflecting surface, to said optical signal-receiving means and information-processing means. The reflecting step may include the use of parabolic reflector means having a focal point coinciding with said spherical center point. The reflecting step may include the use of a multiplicity of optical signal-receiving elements, each oriented so as to receive optically encoded signals traveling along a preselected corresponding path, and a multiplicity of said optical signal-receiving elements are positioned so that a multiplicity of said paths of said optically encoded signals are substantially equal in length.

Yet another embodiment of the current disclosure is a method of processing information, the steps comprising: providing an internal reflecting surface in the shape of a sphere having a spherical center point; transmitting a plurality of optically encoded signals along various distinct paths, a portion of each said path coinciding with a line emanating from a spherical center point, whereby said signals are reflected from said reflecting surface toward the internal surface of the spherical processor; collecting said signals after reflection from said reflecting surface for further processing; providing optical signal-receiving means and information-processing means located at a point remote from said spherical processor; and further reflecting said signals, after reflection from said spherical reflecting surface, to said optical signal-receiving means and information-processing means; wherein said further reflecting step includes the use of parabolic reflector means having a focal point coinciding with said spherical center point; said parabolic reflector means are oriented so as to reflect optically encoded signals, each traveling along a path including a line emanating from the spherical center point of said spherical; and said further reflecting step includes the use of mirror means, external to said spherical reflector means, for routing signals emanating from said parabolic reflector back to said optical signal-processing means.

Additional objects and features of the invention will be more readily apparent from the following detailed description and appended claims when taken in conjunction with the included figures.

For purposes herein, an optical signal routing system is a system for transmitting and receiving optically encoded signals. An optically encoded signal is a modulated electromagnetic or photonic beam having a frequency within the spectrum of electro-magnetic waves that can be partially collimated and reflected off a parabolic or spherical reflector. In a particular embodiment, the optically encoded signal is generated by a diode laser and thus is confined to the portion of the spectrum that can be produced by such devices. For convenience, optically encoded signals are sometimes referred to herein as light beams, and a reflector is sometimes referred to as a mirror.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

FIGS. 4a through 4c depict schematic views of one portion of an optical central processing unit according to selected embodiments of the current disclosure.

DETAILED DESCRIPTION OF THE INVENTION

Figure 1:
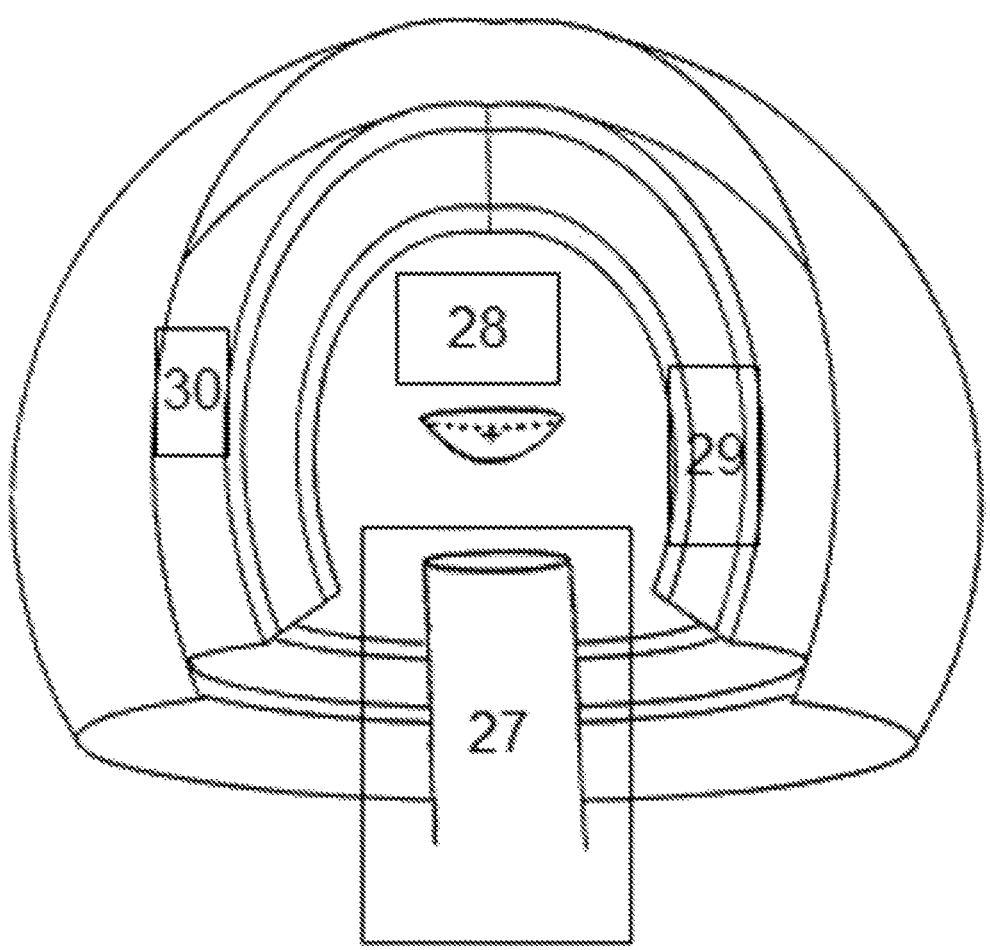
FIG. 1 is a front view section of a block diagram of an information processing system in accordance with selected embodiments of the current disclosure.

Many aspects of the invention can be better understood with the references made to the drawings below. The components in the drawings are not necessarily drawn to scale. Instead, emphasis is placed upon clearly illustrating the components of the present invention.

Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

FIG. 1 shows the central processing unit (CPU) optical interface and system Input/Output (I/O) (27) that includes the external interface that communicates with systems outside the system represented by this work. It may have signal-processing hardware, firmware, and/or software to translate incoming and outgoing signals from communication conventions of the external networks or systems (not shown). The internal cavity (28) enables communications with a plurality of internal optical interface elements and associated memory and processing elements (29), as well as their associated external optical interface elements allowing communication via the external optical interface cavity elements (30).

Figure 2:
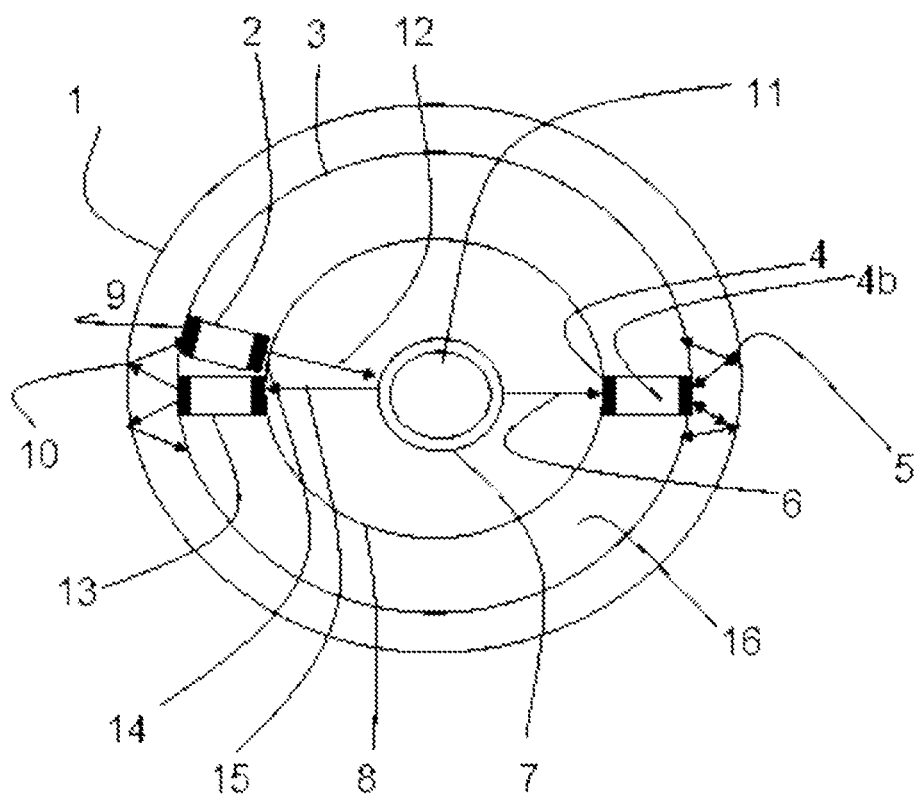
FIG. 2 depicts a section view of one plane of an information processing system in accordance with selected embodiments of the current disclosure.

FIG. 2 depicts a section view of one plane of an information processing system in accordance with selected embodiments of the current disclosure. The CPU optical interface (11) sends or receives data routed via a parabolic mirror (7) or reflector along radial paths (6, 15) to emitters/detectors (4, 14) of memory and/or processing elements (2, 4b, 13) on the internal surface (8) of the distributed parallel processing area (16). A spherical internally reflective mirror (1) routes optically encoded signals (5, 10) from emitters/detectors (9) of memory and/or processing elements (2, 4b, 13) to and from neighboring memory and/or processing elements (2, 4b, 13) on the external surface (3) of the memory and/or processing elements (2, 4b, 13). Synthesized data is returned to the CPU optical interface (11) via a radial path (12).

Figure 3:
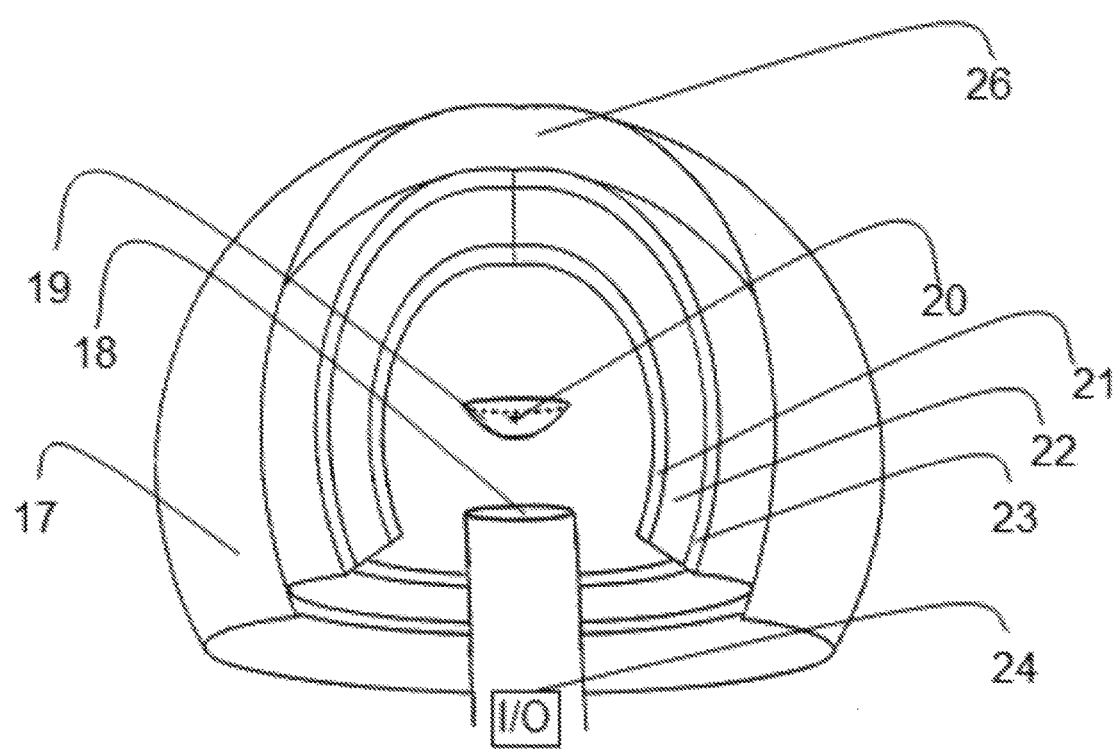
FIG. 3 is a front view depicting a section with one portion removed of an information-processing system in accordance with selected embodiments of the current disclosure.

FIG. 3 is a front view depicting a section with one portion removed of an information-processing system in accordance with selected embodiments of the current disclosure. Optically encoded signals are sent and received from and to the CPU optical interface (11) along rays substantially perpendicular to the parabolic reflector's (19) directrix plane and routed via reflection by the external surface of the parabolic reflector (19) along rays originating from the parabolic focus (20), which is also the spherical mirror's center point (20), and substantially perpendicular to the internal optical interface (21) in communication with a memory and/or processing element (22), which may either respond directly to the CPU optical interface via reflected routing by the parabolic reflector (19), or forward information through the memory and/or processing element's (22) external optical interface (23) for further routing to neighboring memory and/or processing elements' (22) external optical interface (23) via the external optical interface cavity (26) and reflecting off of the spherical internally reflective mirror (17). The CPU optical interface communicates with an input/output interface 24, which interfaces with external systems and devices.

Referring to FIGS. 2 and 3, an information processing system includes a parabolic reflector (7, 19) and an central processing unit (CPU) with an optical interface (11, 18) at least partially enclosed in the spherical internally reflective mirror (17). The CPU optical interface (11, 18) includes a signal-processing unit (SPU), an optical signal transmitter, and an optical signal receiver. It also includes input/output means for receiving input signals from, and transmitting output signals to, points outside the information processing system. Optically encoded signals flow from the transmitter to the receiver in a manner described in more detail below. Here, transmitter elements also have receiver elements in close proximity and are considered to be inherent to each element of the optical interface in the communication system, and can function independently for each element without crosstalk within that element.

Notably, on the external surface, partial collimation may be exploited to allow neighboring cells to communicate with one another. This partial collimation may take the form of annular emission to avoid or minimize crosstalk within each element's emitters and detectors.

Furthermore, the invention herein is set in the context of any information-processing system using optically encoded signals. Thus the information-processing system may use electronic, optical, or optoelectronic processing subsystems (or any combination thereof) for processing the information being carried on the optically encoded signals which are the subject of this invention. The basic building blocks or components for making an information-processing system in accordance with the invention, including a signal-processing unit, transmitter, receiver, and reflectors, are readily available.

While it is assumed for purposes of the discussion herein that the optically encoded signals are embodied in collimated or partially collimated light beams, the invention also encompasses systems using emission systems having relatively wide angles of dispersion. In such cases, only a selected portion (i.e., cross-section) of each transmitted beam is received, which is sufficient to receive the information encoded therein.

In another embodiment, the transmitter is located at or around the first focal point (F1) of the externally reflective parabolic reflector, also referred to more simply as a parabolic reflector. In a particular embodiment, there is also a secondary signal reflector system for routing the light reflected by the parabolic reflector, around the exterior of the spherical internally reflective mirror and back into the central processor via the parabolic reflector to receivers. In certain embodiments, there is an opening in the memory/processing element region coupling the parabolic reflector to the spherical internally reflective minor.

A transmitter may include a multiplexer and a receiver may include a demultiplexer for internal routing of signals in the CPU or other memory and/or processing elements. As is common in fiber optic systems, the receiver may also include a repeater or amplifier. The receiver will generally have a plurality of receiver elements, one for each transmission channel. In other embodiments there could be a signal receiver element for multiple channels, for instance where the various channels had distinct carrier frequencies and the receiver element physically intersected the paths of all the channels and thereby combined a plurality of spectrally distinct signals.

In some embodiments, the parabolic reflector may be half-silvered so as to be transparent to signals impinging on its interior and yet reflect signals impinging on its exterior. However, since no signals can be allowed to escape through the parabolic reflector in a non-parallel direction, provision must be made to either block any such signals, for example by coating the central portion of the interior surface of the parabolic reflector (7, 19) with a signal-absorbing material, or more likely, to ensure that no such signals are ever generated by the system.

In terms of standard information-processing system terminology, each distinct path for an optically encoded signal comprises a distinct channel for transmitting information.

According to the current disclosure, a plurality of optically encoded signals are transmitted from the CPU optical interface along various distinct paths emanating from a plane perpendicular to the axis of the parabolic reflector and reflected thereby along rays emanating from the center of a spherical reflector. Therefore, these optically encoded signals are automatically reflected toward the interior optical interface of the distributed array.

Figure 5:
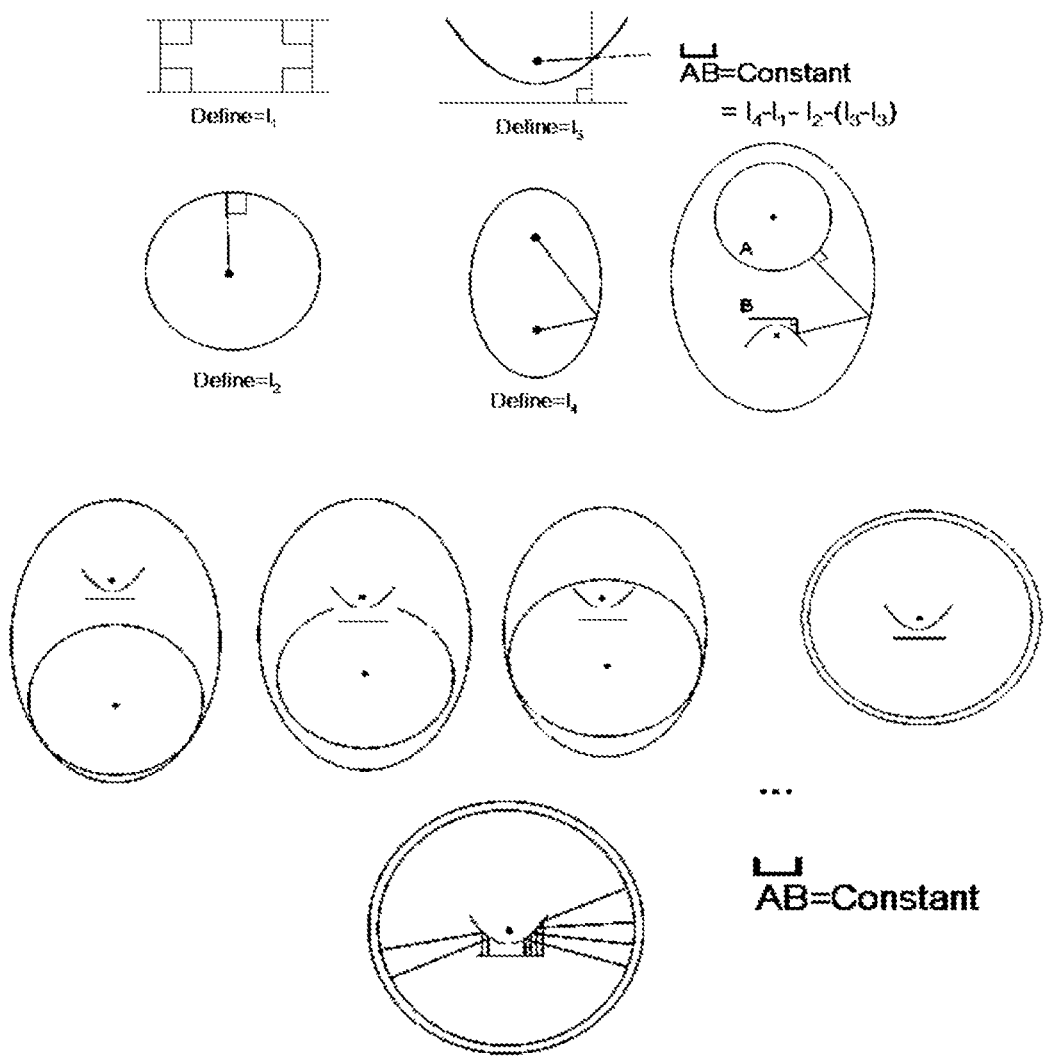
FIG. 5 shows the derivation of the geometry used herein according to selected embodiments of the current disclosure.
Figure 6:
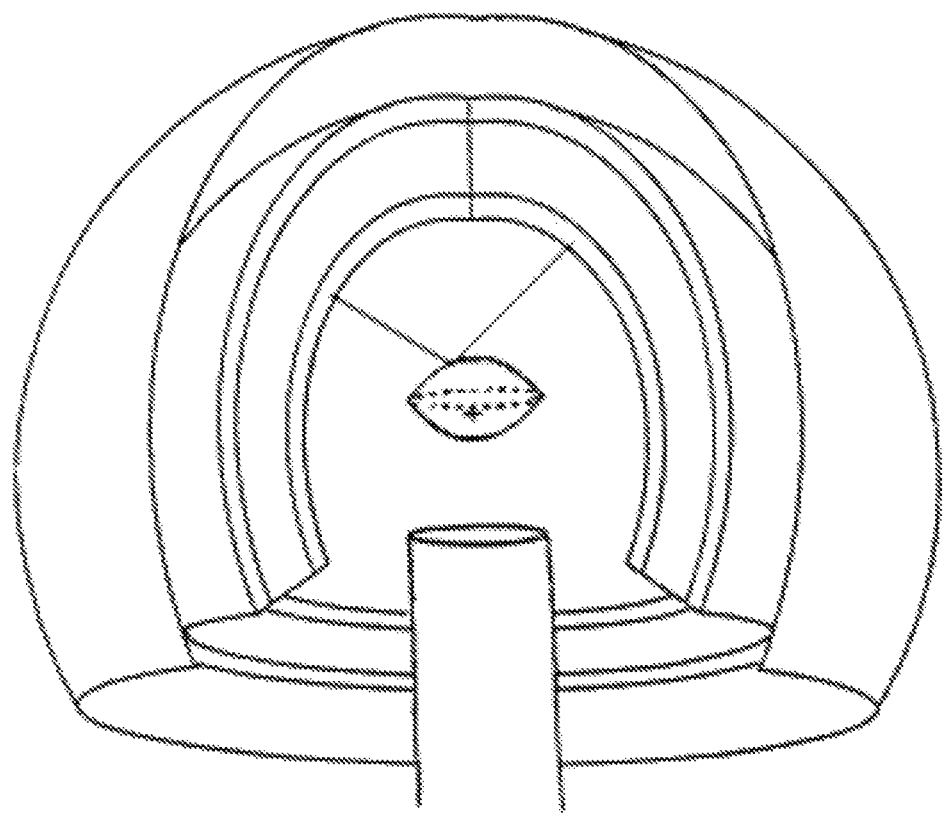
FIG. 6 is a front view of an information processing system with direct single reflection routing from a subset of elements to another subset of elements within the system, without compromise of routings performed by other optical elements according to selected embodiments of the current disclosure.

With reference to FIGS. 5 and 6, parabolic reflectors have the property that light beams emanating from the focal point are automatically reflected in a direction parallel to the axis of the parabola. A corollary of this property is that, for an elliptic paraboloid having an external reflecting surface (referred to here as an external parabolic reflector), optical signals converging on the focal point are automatically reflected in a direction parallel to the major axis of the paraboloid. Naturally, an externally reflected signal travels in the opposite direction of a signal emanating from the focus along the same line and reflected by the internal surface. A second well known property of a paraboloid is that the distance from the focus to any point on the paraboloid is the same as the distance from that point on the paraboloid to a plane called the directrix. The directrix is a plane perpendicular to the axis of the paraboloid and displaced one focal distance below the vertex of the paraboloid. Restated, an elliptic paraboloid is the locus of points P(x,y,z) equidistant from a given point (the focus) and a given plane (the directrix), herein defining distance $l_3$.

The standard equation for an elliptic paraboloid is:

$$y^2 + z^2 = 4Px$$

where P is the focal distance (that is, the distance from the focal point to the vertex) of the paraboloid.

In a particular embodiment, such as that shown in FIG. 3, an external parabolic reflector is located with its focus at the center of a spherical processor/memory array and oriented with its axis perpendicular to the CPU optical interface inside an internal spherical reflector. The vertex of the parabolic reflector faces the CPU optical interface.

In accordance with the physical properties of parabolic reflectors, signals emanating from the CPU optical interface along various distinct lines emanating from its focal point F1 are reflected first by the parabolic reflector toward the interior optical interface along paths coincident with rays emanating from the center on said optical interface. Also, the equidistant length of every signal path, in the preferred embodiment, eliminates the need for worst-case timing and phase-shift considerations.

Thus, in particular embodiments, the parabolic shape of the parabolic reflector causes light beams transmitted from the CPU optical interface toward the external reflective surface of the parabolic reflector parallel to its axis to be reflected as if traveling away from its first focal point F1, and toward the internal optical interface of a memory and/or processing element. The optically encoded signals are then processed in the distributed parallel processing area and then routed back to the CPU optical interface by the externally parabolic reflector.

Referring to FIGS. 4a-c, there is shown a portion of a CPU optical interface including a transmitter according to selected embodiments of the current disclosure. Signals leaving a transmitter (95) are transmitted along various distinct lines emanating from the focal point F1. Each distinct path comprises a separate information transmission channel. In a particular embodiment, integrated optical components (41-45) are mounted on planar media lying in one or more planes (46,47), each having transmitting elements (53) yielding emissions that travel along paths that intersect the focal point F1. In other embodiments, the transmitting components could be discrete components, such as single diode lasers, or a mixture of discrete and integrated components. In a particular embodiment, the output signals are generated by diode lasers incorporated in integrated optical circuits. The output optical signals (51) are oriented so as to emanate radially from the focal point F1.

As with any circuit, the number of input signals (52) and output signals (51) for any circuit (41-45) or set thereof will be different, and the particular numbers may be varied as will be appreciated by those skilled in the art. However, for each output signal (51) the receiver will need a receiver element (see, for example, FIG. 2) to receive and route the signals. That is, each channel must have both transmitting and receiving elements.

Referring once again to FIG. 3, the selection of the shape of the spherical reflector (17) and the parabolic reflector (19) place certain constraints on the directions in which signals can be transmitted from the CPU optical interface (18). In particular, the size of an aperture in the parabolic reflector (19), distributed parallel processing area, or both, through which signals are transmitted to the spherical internally reflective mirror (17) or secondary reflector system limits the angles at which such signals can be directed. The size and shape of the parabolic reflector (19) may further restrict the available directions in which signals can be transmitted if the parabolic reflector (19) subtends a greater angle with respect to the first point than is subtended by the aperture (16). This latter restriction can be avoided by providing a half-silvered parabolic reflector(19), which allows the transmission of signals impinging on its interior and yet reflects signals impinging on its exterior.

The maximum angle, $a_{max}$, that the transmitted signals can make with the major axis is that angle which will generate a signal that exits just within the perimeter of the aperture. The minimum angle, $a_{min}$, is the minimum angle of the major axis with a line from the focal point F1 to a point just outside the perimeter of the aperture which can reflect a signal back to the parabolic reflector (19). Thus the set of possible signal paths exiting the aperture form a ring in the plane perpendicular to the plane shown in FIG. 2.

As should be clear from the above description, the invention can be embodied in a system using only a small portion of a spherical reflector. The only requirement is that a sufficient portion of spherical shaped reflector be provided to handle the number of signal channels needed in the system. Thus, for the purposes herein, a "spherical reflector" or a "reflecting surface in the shape of a sphere" comprises a reflector in the shape of at least a portion of a sphere.

Referring to FIG. 3, the use of a secondary transmission system, such as the spherical internally reflective minor (17), can be avoided by reversing the orientation of the parabolic reflector (19), if other physical system constraints can be accommodated. In particular, at least a portion of the CPU optical interface (18) for handling reflected signals must fit inside the spherical reflector (17) and must have a small enough size to leave a sufficient set of available transmission angles for the transmitter of the CPU optical interface (18). In the embodiment shown in FIG. 3, the minimum angle, $a_{min}$, is the angle that just clears the receiver CPU optical interface and also generates a reflected signal within a certain maximum distance from the axis of the parabolic reflector (19). The maximum angle, $a_{max}$, is the angle that generates a reflected signal that just clears the receiver CPU optical interface (19) and any other parts of the CPU optical interface (18) which might get in the way.

In some embodiments (not shown), the receiver could be totally outside and independent of any spherical reflector if a cylindrical core of the CPU optical interface (18) is left clear for the transmission of reflected signals through the transmitter and possibly other portions of the CPU optical interface (18).

In another variation on the embodiment shown in FIG. 3, the CPU optical interface can include a transmitter and a receiver. In such an embodiment, the direction of the signal paths would be the opposite of or in the same direction as the direction indicated in FIG. 2. In effect, the roles of the path could be reversed, with the optically encoded signals traveling along paths, which include a portion of a line emanating from focus F1 and being reflected by the parabolic reflector as they travel toward its focus F1. Thus the designation of "first" and "second" focal points, indicating the contrast of where the signal is emanating from that being reflected toward the parabolic reflector, is somewhat arbitrary and dependent on the particular embodiment and even on the particular signal channel that is being discussed. The focal points can be the same point simply indicating the direction of the routed optical signals.

Figure 7:
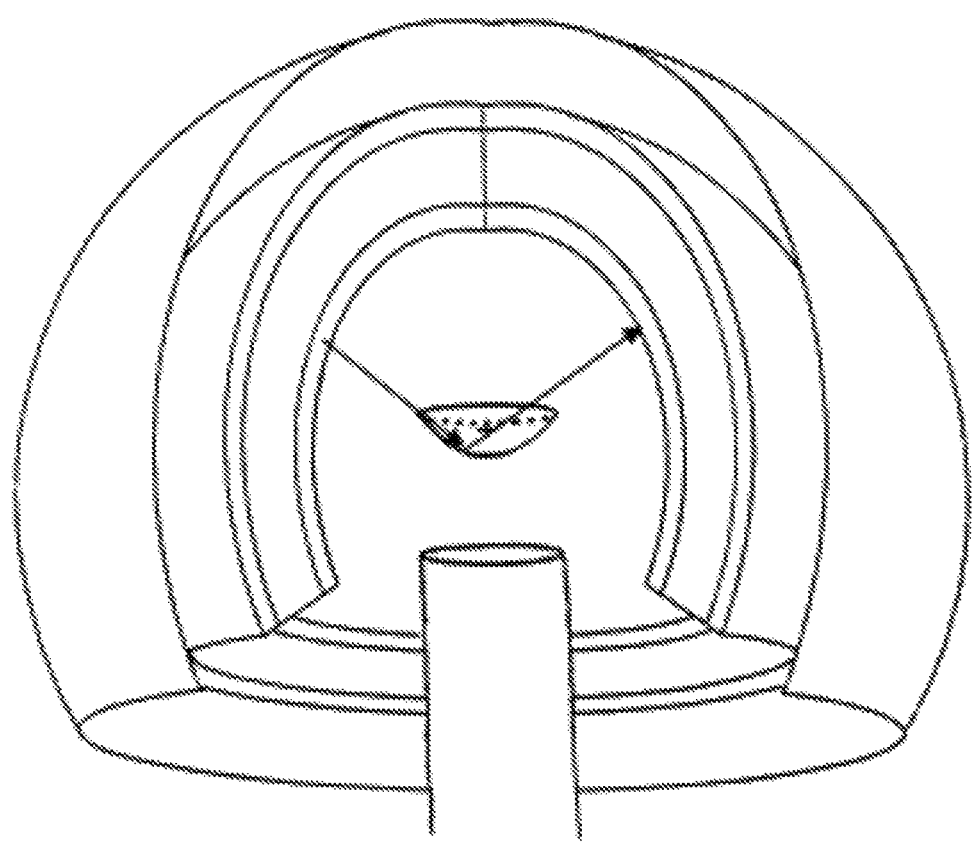
FIG. 7 is a variation of the information processing system shown in FIG. 6 according to selected embodiments of the current disclosure.

In FIGS. 6 and 7, another variation on the embodiment shown in FIG. 3, additional reflectors are placed on the reverse side of the parabolic reflector to provide direct multicasting to a subset of the array. This functionality provides non-relayed optical signals to a significant fraction of the system without primary bus arbitration by the primary CPU optical interface.

The particular technology used in the CPU optical interface, including the signal processor unit SPU, is not limited by the present disclosure. Thus the CPU optical interface may include both optical and electronic signal-processing components, including components for transforming optical signals into electrical signals and vice versa.

The structures shown may act much like the bus structures in electronic computers. The bus in this case comprises the set of signal paths traveling through the parabolic reflector and/or the spherical internally reflective mirror. The optical signals can be synchronized to a central clock by means of optical or electronic AND (or NOR) gates in the transmitter and/or receiver of the CPU optical interface to provide a synchronized bus. The spherical internally reflective mirror and parabolic reflector system provide a connectorless means for transmitting data from one part of an optical computer or signal processor to another. In fact, multifaceted reflectors may be used to approximate the function of one, any, or all of the systems described above and rfall within the scope of the disclosure herein.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

That which is claimed:

1. An information processing system comprising
a central processing unit, where the central processing unit comprises a transmitter;
a parabolic reflector, where an external surface of the parabolic reflector is a reflecting surface, where the parabolic reflector has a focus;
a spherical reflector; where the spherical reflector includes a spherical internally reflective mirror having a center; where the spherical reflector has an internally reflective surface; and
a distributed parallel processing area, where the distributed parallel processing area resides between the parabolic reflector and the spherical reflector;
where the transmitter of the central processing unit transmits one or more optically encoded signals along one or more distinct paths, where a portion of each of the one or more distinct paths coincides with a line emanating from the focus of the parabolic reflector; where a portion of each of the one or more distinct paths of the one or more optically encoded signals coincides with a line emanating from the center of the spherical reflector.

2. The information processing system of claim 1, wherein the spherical reflector is a partial sphere.

3. The information processing system of claim 1, wherein the parabolic reflector has an axis, wherein the transmitter of the central processing unit is located on a plane that is perpendicular to the axis of the parabolic reflector.

4. The information processing system of claim 1, wherein the central processing unit further comprises a receiver.

5. The information processing system of claim 4, wherein the parabolic reflector reflects optically encoded signals converging on the focus of the parabolic reflector to the receiver of the central processing unit.

6. The information processing system of claim 1, wherein the distributed parallel processing area comprises two or more elements.

7. The information processing system of claim 6, wherein each of the two or more elements comprises an external transmitter and an external receiver, where the external transmitter emits optically encoded signals towards the reflective surface of the spherical reflector, where the optically encoded signals emitted towards the reflective surface of the spherical reflector are reflected towards the external receiver of another of the two or more elements.

8. The information processing system of claim 6, wherein each of the two or more elements comprises an internal transmitter and an internal receiver, where the internal transmitter emits optically encoded signals towards the focus of the parabolic reflector; where the optically encoded signals emitted towards the focus of the parabolic reflector are reflected towards the central processing unit.

9. The information processing system of claim 8, wherein at least a portion of the optically encoded signals emitted from the central processing unit towards the parabolic reflector are reflected towards the receivers of the two or more elements.

10. The information processing system of claim 8, further comprising a second reflector, where optically encoded signals emitted from the internal transmitter of one of the two or more elements toward the second reflector are reflected towards the receiver of another of the two or more elements.

11. The information processing system of claim 10, wherein the second reflector is a hyperboloid reflector.

12. The information processing system of claim 11, where the hyperboloid reflector has a focal point, and where the focal point of the hyperboloid reflector coincides with the center of the spherical reflector.

13. The information processing system of claim 1, wherein the focus of the parabolic reflector coincides with the center of the spherical reflector.

14. The information processing system of claim 6, wherein each of the two or more elements is a memory element, a processing element, or a memory and processing element.

15. A system comprising
a central processing unit, where the central processing unit comprises a transmitter;
where the transmitter emits one or more optically encoded signals; and
a parabolic reflector, where an external surface of the parabolic reflector is a reflective surface, where the parabolic reflector has a focus;
a spherical reflector; where the spherical reflector includes a center; where the spherical reflector has an internally reflective surface; and
a distributed processing area, where the distributed processing area resides between the parabolic reflector and the spherical reflector;
where the optically encoded signals emitted by the transmitter of the central processing unit travel along lines parallel to the axis of the parabolic reflector and then reflect off of the parabolic reflector along distinct paths that coincide with lines emanating from the center of the spherical reflector.

16. The system of claim 15, wherein the distributed parallel processing area comprises a plurality of elements, where each of the plurality of elements is a memory element, a processing element, or a memory and processing element.

17. The system of claim 16, wherein each of the plurality of elements comprises an external transmitter, an external receiver, an internal transmitter, and an internal receiver, where the external transmitter emits optically encoded signals towards the reflective surface of the spherical reflector, where the external receiver receives optically encoded signals reflected from the reflective surface of the spherical reflector, where the internal transmitter emits optically encoded signals towards the reflective surface of the parabolic reflector; and where the internal receiver receives optically encoded signals reflected from the reflective surface of the parabolic reflector.

18. The system of claim 15, wherein the focus of the parabolic reflector coincides with the center of the spherical reflector.

* * * * *